(12) United States Patent
Stopler (10) Patent No.: US 7,477,683 B2
(45) Date of Patent: Jan. 13, 2009

(54) PERIODIC DMT SIGNALS WITH CYCLIC EXTENSION

(75) Inventor: Danny Stopler, Holon (IL)

(73) Assignee: STMicroelectronics Ltd., Netanya (IL)

( * ) Notice: Subject to any disclaimer, the term of this patent is extended or adjusted under 35 U.S.C. 154(b) by 740 days.

(21) Appl. No.: 10/946,144

(22) Filed: Sep. 20, 2004

(65) Prior Publication Data

US 2005/0213676 A1   Sep. 29, 2005

Related U.S. Application Data

(60) Provisional application No. 60/557,821, filed on Mar. 29, 2004.

(51) Int. Cl.
*H04L 5/16* (2006.01)
(52) U.S. Cl. .................. 375/222; 725/111; 370/208; 370/210; 370/260; 375/232; 375/219; 375/355
(58) Field of Classification Search .............. 375/222
See application file for complete search history.

(56) References Cited

U.S. PATENT DOCUMENTS

| | | | | |
|---|---|---|---|---|
| 6,438,186 | B1 * | 8/2002 | Strait | 375/354 |
| 6,643,340 | B1 | 11/2003 | Strait | |
| 7,023,938 | B1 * | 4/2006 | Kapoor et al. | 375/350 |
| 7,106,709 | B2 * | 9/2006 | Davidsson et al. | 370/330 |
| 7,113,549 | B1 * | 9/2006 | Isaksson et al. | 375/285 |
| 2003/0048462 | A1 * | 3/2003 | Williams | 358/1.9 |

FOREIGN PATENT DOCUMENTS

| | | |
|---|---|---|
| DE | 199 14 600 A1 | 10/2000 |
| DE | 102 01 851 A1 | 8/2003 |
| EP | 1 283 614 A1 | 2/2003 |
| EP | 1 292 080 A1 | 3/2003 |
| WO | WO-2004/008706 A2 | 1/2004 |
| WO | WO-2004/014008 A2 | 2/2004 |
| WO | WO-2004/086710 A1 | 10/2004 |

OTHER PUBLICATIONS

Qureshi, Shahid U., "Fast Start-Up Equalization with Periodic Training Sequences", IEEE Transactions on Information Theory, Sep. 1977, vol. IT-23, No. 5, pp. 553-563.

(Continued)

*Primary Examiner*—Shuwang Liu
*Assistant Examiner*—Dhaval Patel
(74) *Attorney, Agent, or Firm*—Darby & Darby PC (57) ABSTRACT

A method for digital communication includes generating time-domain symbols having a predetermined symbol duration in accordance with a discrete multi-tone (DMT) modulation scheme. A cyclic extension is added to each of the time-domain symbols so as to form data blocks having a block length that is not an integer multiple of the symbol duration. A training pattern is generated on one or more tones of the DMT modulation scheme, wherein the training pattern is periodic over a sequence of the data blocks with a period equal to the symbol duration. The sequence of the data blocks is transmitted over a communication channel to a receiver, which processes the training pattern so as to determine a response of the channel to the one or more tones.

38 Claims, 2 Drawing Sheets

OTHER PUBLICATIONS

U.S. Appl. No. 60/557,821, filed Mar. 29, 2004 and entitled "Periodic DMT signal with cyclic extension orthogonal transmission and reception methods".

Transmission and Multiplexing (TM), Access Transmission Systems on Metallic Access Cables; Very High Speed Digital Subscriber Line (VDSL); Part 2: Transceiver Specification, Promulgated by the European Telecommunications Standards Institute (ESTI, Sophia Antipolis, France 2002).

Cioffi, et al., "G.vdsl Digital Duplexing: VDSL Performance Improvement by Aversion of Frequency Guard Bands", (ITU Temporary Document NT-041, Nashville, Tennessee, 1999).

* cited by examiner

PERIODIC DMT SIGNALS WITH CYCLIC EXTENSION

CROSS-REFERENCE TO RELATED APPLICATION

This application claims the benefit of U.S. Provisional Patent Application No. 60/557,821, filed Mar. 29, 2004, which is incorporated herein by reference.

FIELD OF THE INVENTION

The present invention relates generally to high-speed digital communication systems, and specifically to methods for transmission and reception of periodic signals using DMT modulation with cyclic extension.

BACKGROUND OF THE INVENTION

Discrete multi-tone (DMT) modulation is used in many types of data communication systems, among them Multi-carrier Very-high-speed Digital Subscriber Line (VDSL) modems, as well as Asymmetric DSL (ADSL). In these systems, N tones are modulated by QAM two-dimensional input frequency-domain symbols. A 2N-point Inverse Fast Fourier Transform (IFFT) then produces a corresponding time-domain symbol, expressed as a real baseband time-domain output signal of 2N real samples in each symbol period. At the receiving side, 2N samples are extracted from the time-domain signal during each symbol period. A FFT is used to demodulate the signal and recover the original QAM symbols on the N tones.

In order for this scheme to work, the timing of the receiver must be symbol-aligned with the transmitter, so that the N tones are mutually orthogonal. This means that for any given tone, only the energy transmitted on that tone will contribute to the received energy on that tone. The received signal, however, may still include interference due to echo and crosstalk. Ordinarily, these interfering signals would not be orthogonal to the tones of the received signal.

To mitigate this problem, VDSL provides a mechanism of digital duplexing, in which the transmissions in both directions on a DMT link are mutually synchronized so as to maintain orthogonality of the signal and echo. This feature, referred to as "MCM duplexing," is described in Annex D of Technical Specification TS 101 270-2 V2.0.8 (2003-05), entitled *Transmission and Multiplexing (TM); Access transmission systems on metallic access cables; Very high speed Digital Subscriber Line (VDSL); Part 2: Transceiver specification*, promulgated by the European Telecommunications Standards Institute (ETSI, Sophia Antipolis, France, 2002), which is incorporated herein by reference. Digital duplexing techniques may also be used to synchronize neighboring links in a common "binder," so as to orthogonalize crosstalk, as well. Further details of digital duplexing are described by Cioffi et al., in "G.vdsl: Digital Duplexing: VDSL Performance Improvement by Aversion of Frequency Guard Bands" (ITU Temporary Document NT-041, Nashville, Tenn., 1999), which is incorporated herein by reference.

In order to synchronize the transmitters at both ends of the VDSL DMT link, a cyclic prefix (CP) and cyclic suffix (CS) are added to each DMT symbol. The CP and CS together are referred to as the cyclic extension of the symbol, having a total length (in samples) CE. Thus, each symbol of length 2N is transmitted within a time-domain data block of length 2N+CE. The length of the cyclic extension is determined by the round-trip delay of the link and is typically much less than 2N. In addition, to reduce the effect of crosstalk among VDSL links in the same binder that are not mutually synchronized, the transmitters apply time windowing to the signals that they transmit.

SUMMARY OF THE INVENTION

In order to make efficient use of the entire available bandwidth, particularly on the low-frequency tones, it is desirable to apply time-domain equalization (TEQ) in the receiver prior to the FFT. The equalizer coefficients for this purpose are determined during link start-up by transmitting a known, periodic training signal from the transmitter to the receiver, and thus measuring the response of the channel to the signal. It is desirable, for ease of processing by the receiver, that the training signal be periodic in the symbol duration, i.e., periodic in $1/\Delta f$ (wherein $\Delta f$ is the tone spacing), or in other words, that the period of the training signal be 2N samples long, equal to the length of the FFT. In ADSL DMT systems, training signals of this sort can be provided by removing the cyclic prefix of the transmitted symbols during start-up.

In systems that use digital duplexing, however, such as VDSL DMT systems, removing or changing the length of the cyclic extension of the symbols transmitted during training is generally unacceptable: Removing or altering the cyclic extension will cause a loss of synchronization, and hence a loss of tone orthogonality with respect to other nearby signals. Thus, there is a need for new types of training signals that are periodic in the symbol duration ($1/\Delta f$), while maintaining the full cyclic extension.

Embodiments of the present invention address this need by defining a pattern of training signals having a variable phase rotation that is periodic in $1/\Delta f$, irrespective of the length of the cyclic extension. Thus, the periodicity of the training signals is maintained over multiple, sequential data blocks, even though the length of each data block is not an integer multiple of $1/\Delta f$. In this manner, tone orthogonality is maintained during training, while still providing periodic training signals that may be used conveniently to measure the channel response on one or more of the DMT tones. The measured response may then be used in setting equalizer coefficients. Time windowing may also be applied to the data blocks containing the training signals, in the same manner as to the normal communication signals on the DMT link.

In some embodiments of the present invention, TEQ is applied by the receiver only on certain tones, typically the tones in a certain low-frequency range. The transmitter likewise applies the training pattern only to the tones that are subject to TEQ. Because tone orthogonality is maintained during start-up, the transmitter may modulate other data (including other start-up signals) on the remaining, non-equalized tones, such as the tones in the high-frequency range. The receiver is then able to demodulate the data on the non-equalized tones while it receives and processes the training signals on the tones that are subject to TEQ.

There is therefore provided, in accordance with an embodiment of the present invention, a method for digital communication, including:

generating time-domain symbols having a predetermined symbol duration in accordance with a discrete multi-tone (DMT) modulation scheme;

adding a cyclic extension to each of the time-domain symbols so as to form data blocks having a block length that is not an integer multiple of the symbol duration;

generating, on one or more tones of the DMT modulation scheme, a training pattern that is periodic over a sequence of the data blocks with a period equal to the symbol duration;

transmitting the sequence of the data blocks over a communication channel to a receiver; and processing the training pattern at the receiver so as to determine a response of the channel to the one or more tones.

In a disclosed embodiment, generating the time-domain symbols includes generating Very-high-speed Digital Subscriber Line (VDSL) symbols, and transmitting the sequence of the data blocks includes synchronizing transmission of the data blocks using digital duplexing, so as to maintain tone orthogonality of signals on the communication channel.

Typically, the method further includes equalizing a signal at the receiver responsively to the response of the channel. In a disclosed embodiment, equalizing the signal includes applying time-domain equalization to the signal, wherein the method may further include transforming the signal to a frequency-domain representation by applying a Fast Fourier Transform (FFT) to the equalized signal, the FFT having a length in time-domain samples that is equal to the symbol duration.

In some embodiments, generating the training pattern includes modulating the one or more tones with a sequence of training symbols, wherein a phase of the training symbols is adjusted responsively to the block length. Typically, the training symbols have predetermined phases, and modulating the one or more tones includes applying a respective phase rotation to each of the training symbols in the sequence. In a disclosed embodiment, the cyclic extension has an extension length CE, and applying the respective phase rotation includes, for each tone of index K among the one or more tones, incrementing the phase of each successive training symbol in the sequence by $$\frac{2\pi \cdot K}{2N}CE,$$

wherein 2N is the symbol duration. Typically, processing the training pattern includes processing the sequence of the data blocks at the receiver to produce frequency-domain samples of the one or more tones, and back-rotating each of the frequency-domain samples by the respective phase rotation.

In one embodiment, the one or more tones include first tones in a tone range of the DMT modulation scheme, and generating the time-domain symbols includes modulating data on second tones in the tone range while generating the training pattern on the first tones, so that the data blocks contain both the training pattern and the data. The method may include demodulating the data on the second tones at the receiver so as to recover the data from the data blocks, while processing the training pattern on the first tones.

Typically, generating the training pattern includes applying a respective phase rotation on each of the one or more tones responsively to the block length, and processing the training pattern includes processing the sequence of the data blocks at the receiver to produce frequency-domain samples of the one or more tones, and back-rotating each of the frequency-domain samples by the respective phase rotation.

There is also provided, in accordance with an embodiment of the present invention, a system for digital communication, including:

a transmitter, which is adapted to generate time-domain symbols having a predetermined symbol duration in accordance with a discrete multi-tone (DMT) modulation scheme, and to add a cyclic extension to each of the time-domain symbols so as to form data blocks having a block length that is not an integer multiple of the symbol duration, the transmitter being further adapted to generate, on one or more tones of the DMT modulation scheme, a training pattern that is periodic over a sequence of the data blocks with a period equal to the symbol duration and to transmit the sequence of the data blocks over a communication channel; and a receiver, which is adapted to receive the sequence of the data blocks from the communication channel and to process the training pattern so as to determine a response of the channel to the one or more tones.

There is additionally provided, in accordance with an embodiment of the present invention, apparatus for digital communication, including:

a transmitter, which is adapted to generate time-domain symbols having a predetermined symbol duration in accordance with a discrete multi-tone (DMT) modulation scheme, and to add a cyclic extension to each of the time-domain symbols so as to form data blocks having a block length that is not an integer multiple of the symbol duration, the transmitter being further adapted to generate, on one or more tones of the DMT modulation scheme, a training pattern that is periodic over a sequence of the data blocks with a period equal to the symbol duration and to transmit the sequence of the data blocks over a communication channel for use by a receiver in determining a response of the channel to the one or more tones.

There is further provided, in accordance with an embodiment of the present invention, apparatus for digital communication, including:

a receiver, which is adapted to receive over a communication channel from a transmitter time-domain symbols having a predetermined symbol duration in accordance with a discrete multi-tone (DMT) modulation scheme, wherein a cyclic extension is added by the transmitter to each of the time-domain symbols so as to form data blocks having a block length that is not an integer multiple of the symbol duration, and wherein a sequence of the data blocks comprises, on one or more tones of the DMT modulation scheme, a training pattern that is periodic over a sequence of the data blocks with a period equal to the symbol duration, wherein the receiver is adapted to receive the sequence of the data blocks from the communication channel and to process the training pattern so as to determine a response of the channel to the one or more tones.

The present invention will be more fully understood from the following detailed description of the embodiments thereof, taken together with the drawings in which:

DETAILED DESCRIPTION OF EMBODIMENTS

Figure 1:
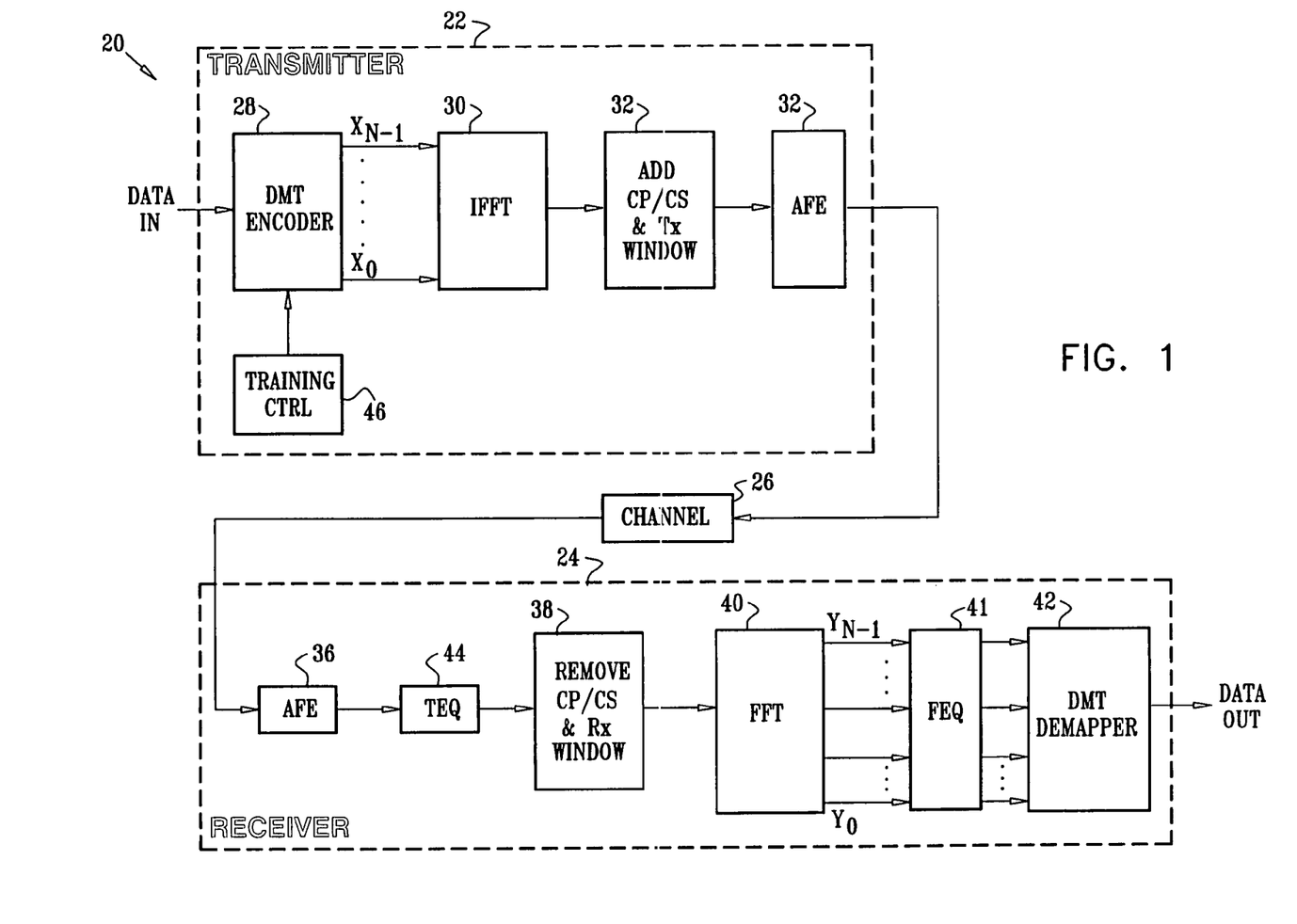
FIG. 1 is a block diagram that schematically illustrates a DMT communication system, in accordance with an embodiment of the present invention.

FIG. 1 is a block diagram that schematically illustrates a DMT communication system 20, in accordance with an embodiment of the present invention. In this exemplary embodiment, it will be assumed for the sake of convenience and clarity of illustration that system 20 operates in accordance with the VDSL specification cited above, although the present invention is by no means limited in its applicability to systems of this specific type.

System 20 comprises a transmitter 22, which transmits DMT signals to a receiver 24 over a channel 26. Typically, channel 26 comprises a bi-directional link, but the additional transmitter and receiver that are used for reverse-direction transmission are omitted here for the sake of simplicity. Transmissions in both directions on the link are mutually synchronized for purposes of digital duplexing, as described above. Also for the sake of simplicity, the figures in the present patent application show only those elements of transmitter 22 and receiver 24 that are useful to understanding the operation of the present invention. The additional elements required for a complete implementation of system 20 will be apparent to those skilled in the art. The elements of transmitter 22 and receiver 24 that are shown in the figures may be implemented using either hard-wired or programmable components, or a combination of different component types. Although the figures show the transmitter and receiver as comprising certain functional blocks, for reasons of conceptual clarity, in actual implementations these blocks may be combined into a single circuit component, or their functions may be divided among several different circuit components, as will be apparent to those skilled in the art.

Transmitter 22 comprises a DMT encoder 28, which receives a stream of digital input data. The encoder modulates the data onto an array of tones 0 through N−1, thus generating frequency-domain symbols $X_0$ through $X_{N-1}$. An IFFT circuit 30 converts the symbols into a time-domain symbol comprising a sequence of 2N real digital samples. Typically, in a VDSL system, the IFFT uses a tone spacing Δf=4.3125 kHz. A cyclic extender 32 adds the required cyclic prefix and cyclic suffix (of total length CE) to each time-domain symbol, thus defining a data block of length 2N+CE. At this point, a transmit window may also be applied to each block. An analog front end (AFE) 34 converts the digital samples to analog signals for transmission over channel 26.

The signals are received by an AFE 36 in receiver 24, which converts the signals to a time-domain sequence of digital samples. Notwithstanding the orthogonality of the tones used in DMT transmission, channel 26 may still create some intersymbol interference (ISI) on the individual tones, particularly at low frequencies. In order to remove the ISI before DMT demodulation, a time-domain equalizer (TEQ) 44 performs initial equalization on the time-domain samples, as described hereinbelow.

A time-domain symbol extraction circuit 38 recovers the symbol timing in the equalized sample stream and thus finds the samples corresponding to the time-domain symbol within each data block. Circuit 38 removes the cyclic prefix and suffix from each time-domain symbol, after applying the corresponding window. The samples corresponding to the time-domain symbol are input to a FFT circuit 40, typically of length 2N, which generates an array of complex frequency-domain samples $Y_0$ through $Y_{N-1}$. A frequency-domain equalizer (FEQ) 41 may be used to equalize any remaining distortion, typically by multiplying the samples on each tone by a respective complex correction factor. A demapper 42 then recovers the transmitted data.

Typically, TEQ 44 comprises an adaptive filter (not shown), such as a multi-tap finite impulse response (FIR) filter, having tap coefficients that are determined based on the response of channel 26. In order to determine the filter coefficients of TEQ 44, a training controller 46 in transmitter 22 generates known training symbols during start-up of system 20, and optionally during subsequent retraining intervals, as well. For each tone K in the range of tones 0 through J−1, controller 46 generates frequency domain training symbols in a certain pattern P(K). Encoder 28 applies a phase rotation, based on the length CE, to the training symbols so that following IFFT circuit 30 and cyclic extender 32, the sequence of time-domain samples p(n) generated by the transmitter due to the training symbols has the form:

$$p(n) = \sum_{K=1}^{N-1} P(K) \cdot e^{j\frac{2\pi \cdot K}{2N} \cdot n} \quad (1)$$

The time pattern p(n) that is generated in this manner is represented by a set of exponents that rotate by a multiple of 2π each period of 1/Δf (i.e., once in each 2N time-domain samples). An exemplary method for generating the desired phase rotation is described hereinbelow.

Figure 2:
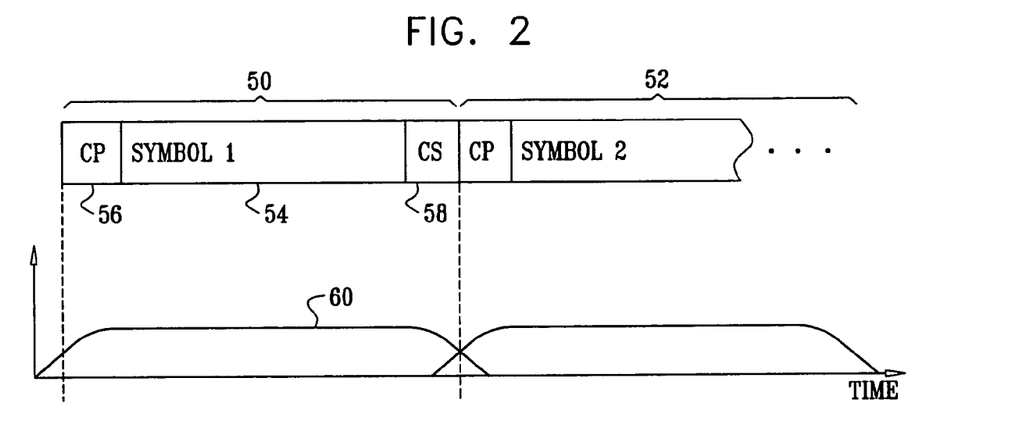
FIG. 2 is a timing diagram that schematically illustrates features of data blocks transmitted in the system of FIG. 1.

FIG. 2 is a timing diagram that schematically shows a sequence of data blocks 50, 52, . . . , transmitted by transmitter 22. As noted earlier, each block comprises a time-domain data symbol 54, generated by IFFT circuit 30, with a cyclic prefix (CP) 56 and cyclic suffix (CS) 58 appended by extender 32. The CP and CS simply repeat the last and first samples, respectively, in the current data symbol, in accordance with the VDSL specification. Extender 32 also applies a time window 60 to the first β samples of prefix 56 and the last β samples of suffix 58 in order to shape the envelope of the transmitted signal.

Figure 3:
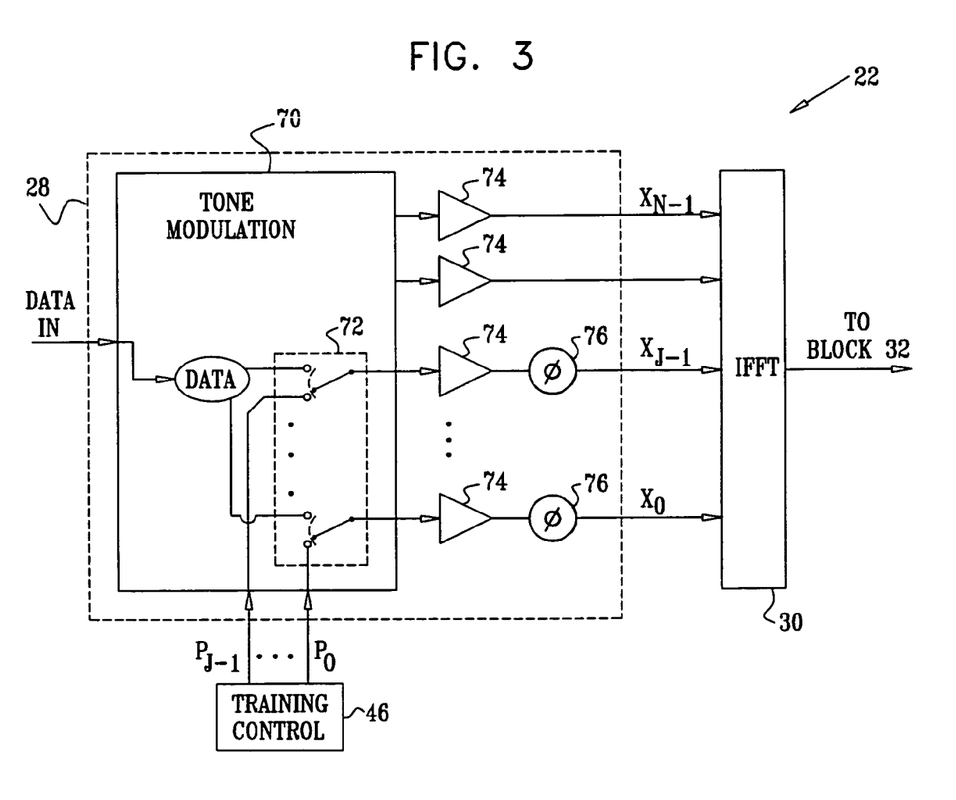
FIG. 3 is a block diagram showing details of a DMT transmitter, in accordance with an embodiment of the present invention.

FIG. 3 is a block diagram that schematically shows certain details of transmitter 22, in accordance with an embodiment of the present invention. A tone modulation circuit 70 in encoder 28 modulates the data that are input to transmitter 22 onto tones 0 through N−1. Training controller 46 prepares frequency-domain training symbols P(K) for transmission on tones 0 through J−1. As noted above, the training symbols may be transmitted on any appropriate set of the tones, including the set of all the tones 0 through N−1. The tones on which training and equalization are to be performed may be set in advance, or they may alternatively be determined by receiver 24 in response to line conditions and then communicated to transmitter 22 (or vice versa). The training procedure described below may be performed on the entire set of J tones at once, or it may be performed successively on individual tones or groups of tones within the set.

Circuit 70 comprises a selector 72, which selects the training symbols for transmission on the appropriate tones during start-up and any other training intervals. During these intervals, circuit 70 may continue to modulate and transmit data on tones J through N−1. Because the tones are orthogonal (assuming digital duplexing is used), there will be little or no interference between the training and data tones. The use of window 60 also reduces interference, even when training and data signals are unsynchronized.

The frequency-domain symbols output by circuit 70 are gain-scaled by multipliers 74, in order to optimize the data rate. When training symbols are transmitted on tones 0 through J−1, these symbols are rotated in phase by rotators 76. Alternatively, the order of operation of multipliers 74 and rotators 76 may be reversed. The phase rotation of rotators 76 is chosen so as to generate an output from IFFT circuit 30 that is periodic in 1/Δf.

In one embodiment, each rotator 76 applies a phase rotation to the respective frequency-domain symbol P(K) that is given by $$e^{j\frac{2\pi \cdot K}{2N} S \cdot CE},$$

wherein S is a symbol index that is incremented with each successive symbol. In practice, the phase rotation for each symbol may be determined simply by adding a constant increment $$\frac{2\pi \cdot K}{2N} CE$$

to the phase shift that was applied to the preceding symbol. Following the IFFT and cyclic extension, the output sample sequence will then have the form:

$$p(n) = \sum_{S=-\infty}^{\infty} w(n - S \cdot (2N + CE)) \cdot \qquad \text{[equation (2)]}$$
$$\sum_{K=1}^{N-1} \left[ e^{j\frac{2\pi \cdot K}{2N} S \cdot CE} \cdot P(K) \right] \cdot e^{j\frac{2\pi \cdot K}{2N}(n - S \cdot (2N + CE))}$$

In this equation, $w(\cdot)$ represents the shape of window 60, while the final exponent $$e^{j\frac{2\pi \cdot K}{2N}(n - S \cdot (2N + CE))}$$

represents the IFFT operation.

Rearranging the terms in equation (2) and simplifying gives the result:

$$p(n) = \sum_{S=-\infty}^{\infty} w(n - S \cdot (2N + CE)) \cdot \qquad \text{[equation (3)]}$$
$$\sum_{K=1}^{N-1} [P(K)] \cdot e^{j\frac{2\pi \cdot K}{2N}(n - S \cdot (2N + CE)) + j\frac{2\pi \cdot K}{2N} S \cdot CE}$$
$$= \sum_{S=-\infty}^{\infty} w(n - S \cdot (2N + CE)) \cdot \sum_{K=1}^{N-1} [P(K)] \cdot e^{j\frac{2\pi \cdot K}{2N} n}$$
$$= \left[ \sum_{K=1}^{N-1} P(K) e^{j\frac{2\pi \cdot K}{2N} n} \right] \cdot \left[ \sum_{S=-\infty}^{\infty} w(n - S \cdot (2N + CE)) \right]$$

Thus, as long as the window term $$\sum_{S=-\infty}^{\infty} w(n - S \cdot (2N + CE))$$

is constant in time, p(n) will have the desired periodic form, as given by equation (1). Many useful windows have this property, for example, linear windows, raised cosine windows (as are used in VDSL), and brickwall windows (as are used in ADSL).

Since p(n) is periodic, the sequence of received samples r(n) produced by AFE 36 in receiver 24 is given by circular convolution of the output signal p(n) with the time-domain response of channel 26, $h_{CHAN}(n)$:

$$r(n) = p(n) \otimes h_{CHAN}(n) \qquad (4)$$
$$= \left\{ \left[ \sum_{K=1}^{N-1} P(K) e^{j\frac{2\pi \cdot K}{2N} n} \right] \otimes h_{CHAN}(n) \right\} \cdot$$
$$\left[ \sum_{S=-\infty}^{\infty} w(n - S \cdot (2N + CE)) \right]$$

(The circular convolution of the signal with the channel response is indifferent to the constant window term.) Replacing the time-domain channel response with its frequency-domain equivalent $H_{CHAN}(K)$, and rearranging terms gives:

$$r(n) = \sum_{S=-\infty}^{\infty} w(n - S \cdot (2N + CE)) \cdot \qquad \text{[equation (5)]}$$
$$\sum_{K=1}^{N-1} \left[ e^{j\frac{2\pi \cdot K}{2N} S \cdot CE} \cdot P(K) \cdot H_{CHAN}(K) \right] \cdot e^{j\frac{2\pi \cdot K}{2N}(n - S \cdot (2N + CE))}$$

The final exponent in this equation corresponds to the FFT operation. Thus, after correction for the window function, FFT circuit 40 will produce a frequency-domain sample $R^{(s)}(K)$ on tone K at each symbol index S according to:

$$R^{(S)}(K) = e^{j\frac{2\pi \cdot K}{2N} S \cdot CE} \cdot P(K) \cdot H_{CHAN}(K) \qquad (6)$$

Since the training pattern P(K) is known, the channel response may now be derived simply by back-rotating each received frequency-domain sample and dividing by P(K):

$$H_{CHAN}(K) = \frac{R^{(S)}(K) \cdot e^{-j\frac{2\pi \cdot K}{2N} S \cdot CE}}{P(K)} \qquad (7)$$

In practice, P(K) typically has unit magnitude, so that the division by P(K) can be replaced simply by multiplying by the conjugate P*(K). The channel response is thus measured simply using the conventional synchronization and FFT circuits in receiver 24, without the need for specialized channel measurement circuitry. TEQ 44 is then set so as to compensate in the time domain for the measured frequency-domain channel response. As noted earlier, because of the tone orthogonality, the channel measurement is not degraded by data signals on other tones, and data transmitted on these other tones can be demodulated by receiver 24 simultaneously with the channel measurement.

Although in the embodiment described above, periodic training signals are generated conveniently by simply applying a certain phase rotation to the training pattern, other methods may also be used to generate training signals that are periodic in 1/Δf. For example, training controller 46 may track the symbol index and data block boundaries, and may thus directly generate frequency-domain symbols that are already aligned with the proper phase. Methods of this sort, though possibly less convenient that the phase rotation method described earlier, are also considered to be within the scope of the present invention. Furthermore, although the embodiments described hereinabove refer specifically to certain features of VDSL, the principles of the present invention may similarly be applied in other types of communication systems that use multi-tone signals, and particularly systems using DMT with digital duplexing.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for digital communication, comprising:
   generating time-domain symbols having a predetermined symbol duration in accordance with a discrete multi-tone (DMT) modulation scheme;
   adding a cyclic extension having an extension length CE to each of the time-domain symbols so as to form data blocks having a block length that is not an integer multiple of the symbol duration;
   generating, on one or more tones of the DMT modulation scheme, a training pattern that is periodic, with a period equal to the symbol duration, over a sequence of the data blocks that includes the cyclic extension, by modulating the one or more tones with a succession of training symbols and applying a respective phase rotation to each of the training symbols so as to increment the phase of each successive training symbol by an amount proportional to the extension length CE of the cyclic extension;
   transmitting the sequence of the data blocks over a communication channel to a receiver; and
   processing the training pattern at the receiver so as to determine a response of the channel to the one or more tones.

2. The method according to claim 1, wherein generating the time-domain symbols comprises generating Very-high-speed Digital Subscriber Line (VDSL) symbols.

3. The method according to claim 1, wherein transmitting the sequence of the data blocks comprises synchronizing transmission of the data blocks using digital duplexing, so as to maintain tone orthogonality of signals on the communication channel.

4. The method according to claim 1, and comprising equalizing a signal at the receiver responsively to the response of the channel.

5. The method according to claim 4, wherein equalizing the signal comprises applying time-domain equalization to the signal.

6. The method according to claim 5, and comprising transforming the signal to a frequency-domain representation by applying a Fast Fourier Transform (FFT) to the equalized signal, the FFT having a length in time-domain samples that is equal to the symbol duration.

7. The method according to claim 1, wherein applying the respective phase rotation comprises, for each tone of index K among the one or more tones, incrementing the phase of each successive training symbol in the sequence by $$\frac{2\pi \cdot K}{2N} CE,$$

wherein 2N is the symbol duration.

8. The method according to claim 1, wherein processing the training pattern comprises processing the sequence of the data blocks at the receiver to produce frequency-domain samples of the one or more tones, and back-rotating each of the frequency-domain samples by the respective phase rotation.

9. The method according to claim 1, wherein the one or more tones comprise first tones in a tone range of the DMT modulation scheme, and wherein generating the time-domain symbols comprises modulating data on second tones in the tone range while generating the training pattern on the first tones, so that the data blocks contain both the training pattern and the data.

10. The method according to claim 9, and comprising demodulating the data on the second tones at the receiver so as to recover the data from the data blocks, while processing the training pattern on the first tones.

11. The method according to claim 1, wherein generating the training pattern comprises applying a respective phase rotation on each of the one or more tones responsively to the block length, and wherein processing the training pattern comprises processing the sequence of the data blocks at the receiver to produce frequency-domain samples of the one or more tones, and back-rotating each of the frequency-domain samples by the respective phase rotation.

12. The method according to claim 11, wherein the cyclic extension has the extension length CE and wherein applying the respective phase rotation comprises, for each tone of index K among the one or more tones, incrementing a phase of each successive frequency-domain symbol transmitted on the tone by $$\frac{2\pi \cdot K}{2N} CE,$$

wherein 2N is the symbol duration.

13. A system for digital communication, comprising:
   a transmitter, which is adapted to generate time-domain symbols having a predetermined symbol duration in accordance with a discrete multi-tone (DMT) modulation scheme, and to add a cyclic extension having an extension length CE to each of the time-domain symbols so as to form data blocks having a block length that is not an integer multiple of the symbol duration, the transmitter being further adapted to generate, on one or more tones of the DMT modulation scheme, a training pattern that is periodic, with a period equal to the symbol duration, over a sequence of the data blocks that includes the cyclic extension, by modulating the one or more tones with a succession of training symbols and applying a respective phase rotation to each of the training symbols so as to increment the phase of each successive training symbol by an amount proportional to the extension length CE of the cyclic extension, and to transmit the sequence of the data blocks over a communication channel; and
   a receiver, which is adapted to receive the sequence of the data blocks from the communication channel and to process the training pattern so as to determine a response of the channel to the one or more tones.

14. The system according to claim 13, wherein the time-domain symbols comprise Very-high-speed Digital Subscriber Line (VDSL) symbols.

15. The system according to claim 13, wherein the transmitter is adapted to synchronize transmission of the data blocks using digital duplexing, so as to maintain tone orthogonality of signals on the communication channel.

16. The system according to claim 13, wherein the receiver comprises an equalizer, which is coupled to equalize a signal received over the communication channel responsively to the response of the channel.

17. The system according to claim 16, wherein the equalizer is adapted to apply time-domain equalization to the signal.

18. The system according to claim 17, wherein the receiver comprises a Fast Fourier Transform (FFT) circuit, which is adapted to transform the equalized signal to a frequency-domain representation by applying a FFT having a length in time-domain samples that is equal to the symbol duration.

19. The system according to claim 13, wherein the phase rotator is adapted, for each tone of index K among the one or more tones, to increment the phase of each successive training symbol in the sequence by $$\frac{2\pi \cdot K}{2N} CE,$$

wherein 2N is the symbol duration.

20. The system according to claim 13, wherein the receiver is adapted to process the sequence of the data blocks so as to produce frequency-domain samples of the one or more tones, and to back-rotate each of the frequency-domain samples by the respective phase rotation.

21. The system according to claim 13, wherein the one or more tones comprise first tones in a tone range of the DMT modulation scheme, and wherein the transmitter is adapted to modulate data on second tones in the tone range while generating the training pattern on the first tones, so that the data blocks contain both the training pattern and the data.

22. The system according to claim 21, wherein the receiver is adapted to demodulate the data on the second tones so as to recover the data from the data blocks, while processing the training pattern on the first tones.

23. The system according to claim 13, wherein the transmitter is adapted to generate the training pattern by applying a respective phase rotation on each of the one or more tones responsively to the block length, and wherein the receiver is adapted to process the sequence of the data blocks to produce frequency-domain samples of the one or more tones, and to back-rotate each of the frequency-domain samples by the respective phase rotation.

24. The system according to claim 23, wherein the cyclic extension has the extension length CE, and wherein the transmitter is adapted, for each tone of index K among the one or more tones, to increment a phase of each successive frequency-domain symbol transmitted on the tone by $$\frac{2\pi \cdot K}{2N} CE,$$

wherein 2N is the symbol duration.

25. Apparatus for digital communication, comprising:
a transmitter, which is adapted to generate time-domain symbols having a predetermined symbol duration in accordance with a discrete multi-tone (DMT) modulation scheme, and to add a cyclic extension having an extension length CE to each of the time-domain symbols so as to form data blocks having a block length that is not an integer multiple of the symbol duration, the transmitter being further adapted to generate, on one or more tones of the DMT modulation scheme, a training pattern that is periodic, with a period equal to the symbol duration, over a sequence of the data blocks that includes the cyclic extension, by modulating the one or more tones with a succession of training symbols and applying a respective phase rotation to each of the training symbols so as to increment the phase of each successive training symbol by an amount proportional to the extension length CE of the cyclic extension, and to transmit the sequence of the data blocks over a communication channel for use by a receiver in determining a response of the channel to the one or more tones.

26. The apparatus according to claim 25, wherein the time-domain symbols comprise Very-high-speed Digital Subscriber Line (VDSL) symbols.

27. The apparatus according to claim 25, wherein the transmitter is adapted to synchronize transmission of the data blocks using digital duplexing, so as to maintain tone orthogonality of signals on the communication channel.

28. The apparatus according to claim 25, wherein the phase rotator is adapted, for each tone of index K among the one or more tones, to increment the phase of each successive training symbol in the sequence by $$\frac{2\pi \cdot K}{2N} CE,$$

wherein 2N is the symbol duration.

29. The apparatus according to claim 25, wherein the one or more tones comprise first tones in a tone range of the DMT modulation scheme, and wherein the transmitter is adapted to modulate data on second tones in the tone range while generating the training pattern on the first tones, so that the data blocks contain both the training pattern and the data.

30. Apparatus for digital communication, comprising:
a receiver, which is adapted to receive over a communication channel from a transmitter time-domain symbols having a predetermined symbol duration in accordance with a discrete multi-tone (DMT) modulation scheme, wherein a cyclic extension having an extension length CE is added by the transmitter to each of the time-domain symbols so as to form data blocks having a block length that is not an integer multiple of the symbol duration, and
wherein a sequence of the data blocks comprises, on one or more tones of the DMT modulation scheme, a training pattern that is periodic, with a period equal to the symbol duration, over a sequence of the data blocks that includes the cyclic extension, formed by modulating the one or more tones with a succession of training symbols and applying a respective phase rotation to each of the training symbols so as to increment the phase of each successive training symbol by an amount proportional to the extension length CE of the cyclic extension,
wherein the receiver is adapted to receive the sequence of the data blocks from the communication channel and to process the training pattern so as to determine a response of the channel to the one or more tones.

31. The apparatus according to claim 30, wherein the time-domain symbols comprise Very-high-speed Digital Subscriber Line (VDSL) symbols.

32. The apparatus according to claim 30, wherein transmission of the data blocks is synchronized using digital duplexing, so as to maintain tone orthogonality of signals on the communication channel.

33. The apparatus according to claim 30, wherein the receiver comprises an equalizer, which is coupled to equalize a signal received over the communication channel responsively to the response of the channel.

34. The apparatus according to claim 33, wherein the equalizer is adapted to apply time-domain equalization to the signal.

35. The apparatus according to claim 34, wherein the receiver comprises a Fast Fourier Transform (FFT) circuit, which is adapted to transform the equalized signal to a frequency-domain representation by applying a FFT having a length in time-domain samples that is equal to the symbol duration.

36. The apparatus according to claim 30, wherein the receiver is adapted to process the sequence of the data blocks to produce frequency-domain samples of the one or more tones, and to back-rotate each of the frequency-domain samples by the respective phase rotation.

37. The apparatus according to claim 36, wherein the phase rotation of each successive frequency-domain symbol transmitted on each tone of index K among the one or more tones is incremented by $$\frac{2\pi \cdot K}{2N} CE,$$

wherein 2N is the symbol duration.

38. The apparatus according to claim 30, wherein the data blocks comprise data, which is modulated on second tones in the tone range while the training pattern is transmitted on the first tones, so that the data blocks contain both the training pattern and the data, and wherein the receiver is adapted to demodulate the data on the second tones so as to recover the data from the data blocks, while processing the training pattern on the first tones.

* * * * *